No. 810,799. PATENTED JAN. 23, 1906.
J. W. PAGE.
MEASURING DEVICE.
APPLICATION FILED MAR. 3, 1905.

Witnesses
Edwin F. McKee

Inventor
J. W. Page
By Victor J. Evans
Attorney

UNITED STATES PATENT OFFICE.

JOSEPH W. PAGE, OF CHARLOTTE, NORTH CAROLINA.

MEASURING DEVICE.

No. 810,799.      Specification of Letters Patent.      Patented Jan. 23, 1906.

Application filed March 3, 1905. Serial No. 248,318.

*To all whom it may concern:*

Be it known that I, JOSEPH W. PAGE, a citizen of the United States, residing at Charlotte, in the county of Mecklenburg and State of North Carolina, have invented new and useful Improvements in Measuring Devices, of which the following is a specification.

This invention relates to measuring devices designed especially for dispensing sugar, flour, and other dry material, and has for its objects to produce a comparatively simple inexpensive device of this character in which the material may be readily measured according to its weight, one wherein the measure may be readily and accurately adjusted for receiving different quantities of the material to be handled, and one wherein the parts after adjustment may be quickly and securely locked in position.

To these ends the invention comprises the novel features of construction and combination of parts more fully hereinafter described.

Figure 1:
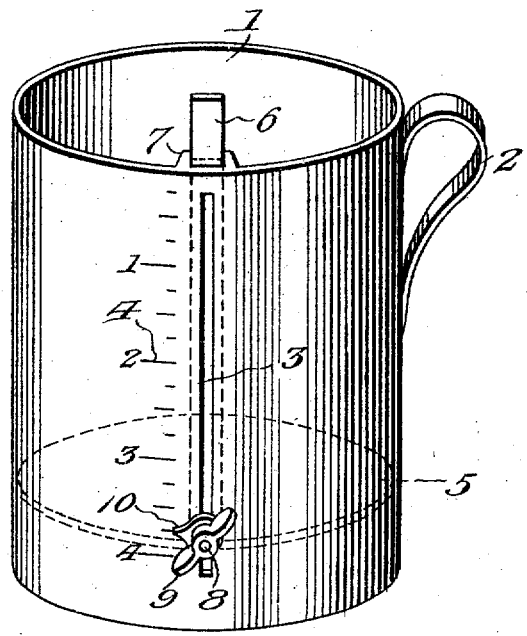
Figure 2:
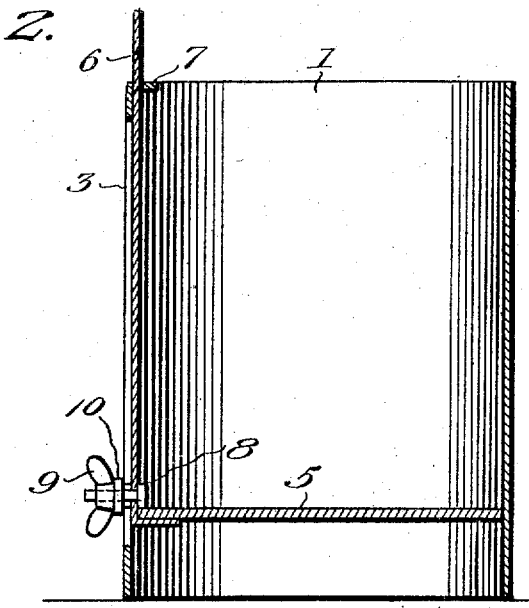

In the accompanying drawings, Figure 1 is a perspective view of a device embodying the invention. Fig. 2 is a vertical section longitudinally therethrough, the section being taken through the guide member.

Referring to the drawings, 1 designates a vessel, preferably composed of sheet metal and in the form of a cup, having a handle 2 and provided in its side wall with a longitudinal guide-slot 3, there being indicated on the outer face of the vessel at one side of the slot a scale 4, graduated in pounds and fractions thereof.

The vessel 1 is equipped with a movable member or bottom 5, designed to slide freely longitudinally of the vessel and carried by a guide member or bar 6, which in turn is arranged to slide through a guideway in the form of a perforated ear 7, formed at the upper end of the vessel, there being entered through the guide-bar 6 near its lower end and slot 3 a fastening device, preferably in the form of a bolt 8, provided with a winged clamping-nut 9 and carrying a pointer 10, adapted to coöperate with the scale 4 for indicating the position of the bottom 5 when adjusting the latter to adapt the measure for holding certain quantities in weight of the material to be handled.

In practice, supposing it to be desirable to measure two pounds of material, the nut 9 is released and the bottom moved upward until the pointer registers with the two-pound mark upon the scale 4, whereupon the bottom will be fixed in position by again tightening the nut, it being understood that this operation is followed in adapting the device for other quantities of material. It may be mentioned in this connection that in practice the size of the measure will be changed according to the varying specific gravities of the different materials to be handled, or, in other words, that for each material there will be a cup of a size adapted to that especial material. For example, a cup adapted for weighing shot will be of smaller diameter and the graduations closer together than in the instance of a cup employed for weighing flour.

From the foregoing it is apparent that I produce a simple inexpensive device admirably adapted for the attainment of the ends in view and one which will materially simplify the labor attendant upon dispensing dry materials, it being understood that minor changes in the details herein set forth may be resorted to without departing from the spirit of the invention.

Having thus fully described the invention, what is claimed as new is—

1. A device of the class described comprising a vessel having a movable bottom and a guide-slot, a guideway carried by the vessel in line with said slot, a guide member attached to the bottom and movable through the guideway, said member serving as a closure for the guide-slot, and means for fixing the bottom in adjusted positions.

2. A device of the class described comprising a vessel having a movable bottom and a guide-slot, a graduated scale provided on the vessel adjacent the slot, a guideway carried by the vessel in line with the guide-slot, a guide member attached to the bottom and movable through the guideway, said member serving as a closure for the guide-slot, a pointer movable with the bottom and coöperating with the scale to determine the movements of the bottom, and means for fixing the bottom in adjusted positions.

In testimony whereof I affix my signature in presence of two witnesses.

JOSEPH W. PAGE.

Witnesses:
     F. M. BISANER,
     C. G. MULLEN.